J. S. CUTTER.

Assignor to J. M. Davis.

PROCESS OF PREPARING VEGETABLE FIBER FOR UPHOLSTERING.

No. 7,668. Reissued May 8, 1877.

Witnesses,

Chas H. Smith

Harold Serrell,

Inventor

James S. Cutter per Lemuel W. Serrell

Atty

UNITED STATES PATENT OFFICE.

JAMES S. CUTTER, OF BROOKLYN, N. Y., ASSIGNOR TO JOSEPH M. DAVIS.

IMPROVEMENT IN PROCESSES FOR PREPARING VEGETABLE FIBER FOR UPHOLSTERING.

Specification forming part of Letters Patent No. 171,357, dated December 21, 1875; reissue No. 7,668, dated May 8, 1877; application filed June 3, 1876.

*To all whom it may concern:*

Be it known that I, JAMES S. CUTTER, of Brooklyn, in the county of Kings and State of New York, have invented an Improvement in the Process of Preparing Vegetable Fiber for Upholstering, of which the following is a specification:

My improvement relates to the process of preparing vegetable fiber, such as palmetto, for filling mattresses, and for other upholstery and packing purposes.

In the preparation of vegetable and other fiber it has been usual heretofore to twist the fiber into the form of a rope, and then steam and afterward dry the rope, and open the same by untwisting and picking. By the untwisting and picking operations the fiber is straightened to such an extent that much of its elasticity is destroyed and the usefulness of the material lessened.

My improvement relates to a method of preparing said fiber. The first part consists in stripping up the said palmetto or other vegetable fiber while in a sufficiently moist condition to cause it to tear into strips without breaking into short pieces by the action of the stripping or picking machine.

Figure 1:
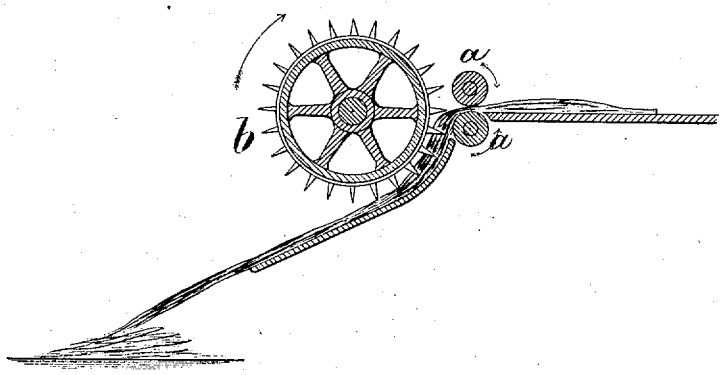

I have shown in Figure 1 a machine adapted to perform the stripping or picking operation, *a a* being a pair of feeding and holding rollers, and *b* being a revolving wheel, with teeth or spikes that serve to pick, tear, or strip the palmetto up into strips of the proper fineness. The fiber may be moistened before being stripped up, though this is not indispensable when the material is in the proper condition.

The next stage of my process or method is a crimping operation.

Figure 2:
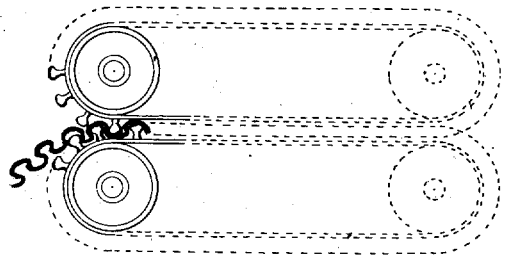

Fig. 2 represents, by a sectional view, an apparatus that may be used for crimping the fiber.

The fluted rollers, or the equivalents thereof, consisting in belts with T-shaped bars passing around pairs of rollers, serve as a means for crimping the fiber, so that instead of assuming the spiral or twisted form heretofore given in preparing fiber, the fiber is made undulating or zigzag, as illustrated in Fig. 2. While the material is in this form it is heated sufficiently to dry and to set the sap or gluten, and retain the fiber rigidly in the form that is given to it by the fluted rollers, and with this object in view the rollers or mechanism employed may be heated.

After the fiber has been thus prepared it is ready for use; but generally it will be opened by hand or otherwise, to loosen it up before being used.

I claim as my invention—

The method herein described of preparing palmetto or other vegetable fiber for upholstering by reducing the same into strips while in a sufficiently moist condition, and then crimping the fiber by machinery, and drying the same by heat sufficiently to set the crimp, substantially as set forth.

Signed by me this 4th day of May, A. D. 1876.

JAMES S. CUTTER.

Witnesses:

GEO. T. PINCKNEY,
HAROLD SERRELL.